Oct. 30, 1928. 1,689,953
M. H. LUTZ, JR
ENGINE PISTON
Filed July 25, 1927
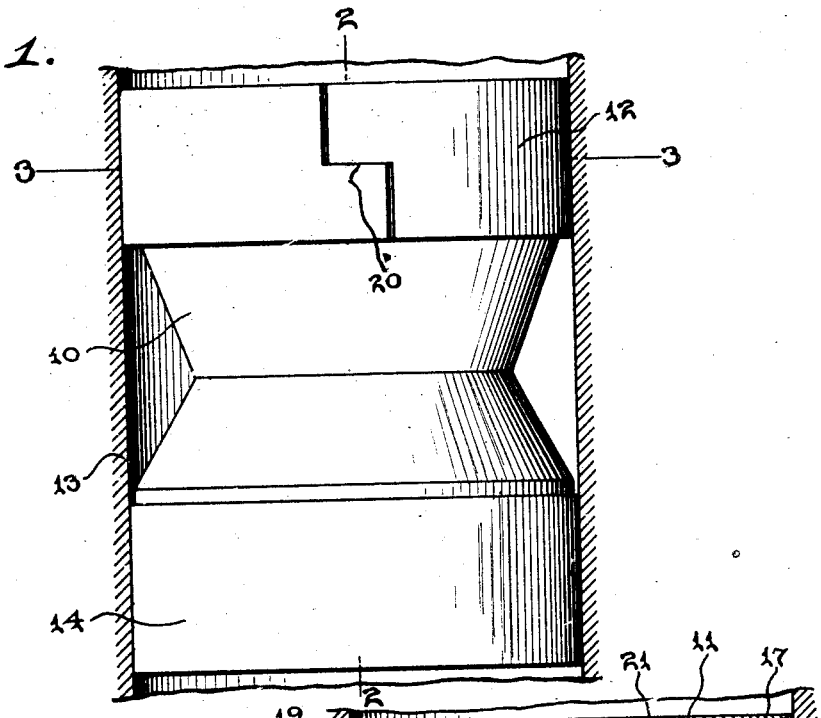
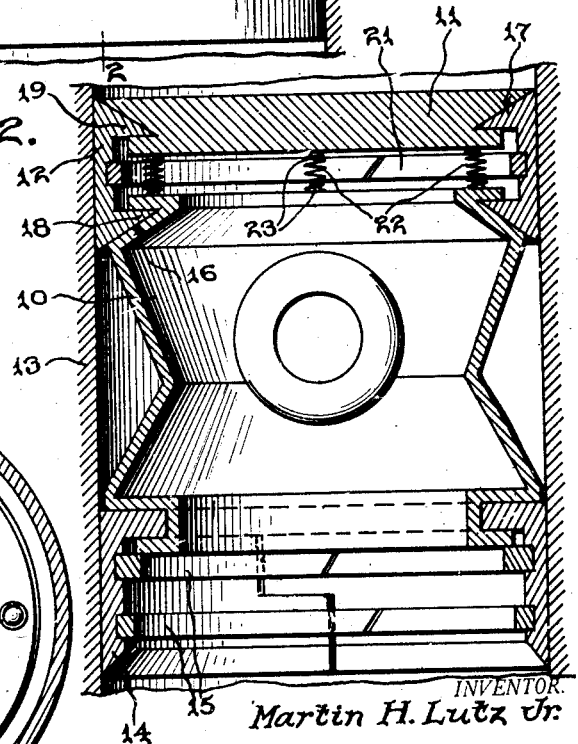
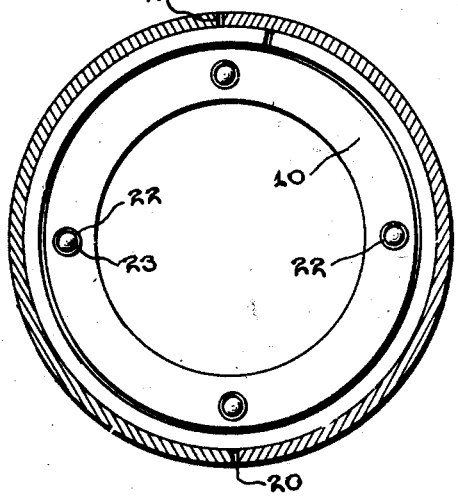
INVENTOR.
Martin H. Lutz Jr.
BY
ATTORNEY.

Patented Oct. 30, 1928.

1,689,953

UNITED STATES PATENT OFFICE.

MARTIN H. LUTZ, JR., OF NELSONVILLE, OHIO.

ENGINE PISTON.

Application filed July 25, 1927. Serial No. 208,275.

The object of the invention is to provide an engine piston in which the friction attending its use will be reduced to a minimum; to provide a construction which will automatically take care of compression by increasing the contact pressure between the cylinder wall and that element of the piston engaged by it; to provide a construction in which the possibility of the occurrence of piston slap will be reduced to a minimum if not avoided altogether; to provide a piston which will be light in weight and of a character to provide a long life as well as to prevent scoring of the cylinders; to provide a piston in which the cylinder wear attending its use will be evenly distributed throughout, so that the cylinder may remain true and thus avoid the necessity for re-boring; and to provide a piston construction in which vibration will be materially reduced, carbon deposits practically eliminated and a material saving in oil effected.

With this object in view, the invention consists in a construction and combination of parts of which a preferred embodiment is illustrated in the accompanying drawings, wherein:

Figure 1 is a view in side elevation of the improved piston, the cylinder wall being shown in section.

Figures 2 and 3 are respectively sectional views on the planes indicated by the lines 2—2 and 3—3 of Figure 1.

The piston constituting the invention comprises a body portion 10 and a head 11 separate from the body portion and connected with the latter by a compression ring 12 but movable with respect to the body portion. Diametrically the body portion is materially less than that of the cylinder 13 so that at no time, during its operation, may the body portion be brought into contact with the cylinder wall. In the illustrated embodiment an irregular body portion is illustrated as constituting a good design but the essential feature is that it shall be materially reduced in diameter below that of the cylinder.

At the crank case end, the cylinder carries an oil ring 14 and attendant expansion rings 15 but specific description of these is omitted because of their being identical with that shown in Patent No. 1,469,656, dated October 2, 1923.

The body portion of the cylinder at the head end is provided with a peripheral V-shaped groove 16 and the head of the cylinder with a similar groove 17, the compression ring 12 having lips 18 and 19 engaging these two grooves. The adjacent side walls of the grooves in the body portion and in the head lie in planes parallel to the axis of the cylinder which disposes the remaining walls at acute angles to said axis, the inclined wall in the head being at the opposite angle to that of the inclined wall in the body portion. By this construction, any tendency to force the head toward the body portion of the cylinder tends to diametrical expansion of the compression ring by virtue of the inclined coacting surfaces of the grooves and lips.

The compression ring is split diametrically so that it thereby comprises complemental sections of which the joints between the two are overlapping as indicated at 20 and the two complemental sections are yieldingly impelled into contact with the cylinder wall by a split expansion ring 21 seated in an inner peripheral groove in the two sections.

The head 11 is yieldingly impelled away from the body portion 10 by interposed compression springs 22 of which the extremities engage button-like projections 23 formed on the body portion and head respectively.

During the firing and compression strokes, the pressure exerted on the head 11 will tend to force it toward the body portion and therefore effect diametrical expansion of the compression ring into firm contact with the cylinder wall, thus maintaining a tight joint at these periods in the cycle of operation. During the scavenging and intake strokes, the head 11 will not be subject to pressure and will recede from the body portion because of the springs 22. The compression ring will then be subject to the pressure of the expansion ring which, however, will keep it in contact with the cylinder wall to prevent the passage of oil around it and because of its wedge-shaped connection with the piston body and head will tend to retain the two concentric with it, so that there will be no tendency of any part of the piston or head to come in contact with the cylinder wall.

The invention having been described, what is claimed as new and useful is:

1. A piston comprising a body portion, a head separate from the body portion, the piston and the head being formed with peripheral grooves having side walls disposed at acute angles to the axis of the piston, the wall in the head being at the opposite angle from that in the body portion, and a compression ring bounding the head and a part of the body portion and having lips conforming in shape to the shape of the grooves in the same.

2. A piston comprising a body portion, a head separate from the body portion, the piston and the head being formed with peripheral grooves having side walls disposed at acute angles to the axis of the piston, the wall in the head being at the opposite angle from that in the body portion, and a compression ring bounding the head and a part of the body portion and having lips conforming in shape to the shape of the grooves in the same and compression springs interposed between the head and the body portion.

3. A piston comprising a body portion, a head separate from the body portion, the piston and the head being formed with peripheral grooves having side walls disposed at acute angles to the axis of the piston, the wall in the head being at the opposite angle from that in the body portion, and a compression ring bounding the head and a part of the body portion and having lips conforming in shape to the shape of the grooves in the same, and compression springs comprising complemental sections and a split expansion ring seated in a groove in the inner periphery of said sections.

In testimony whereof he affixes his signature.

MARTIN H. LUTZ, Jr